United States Patent [19]

Torregrossa

[11] Patent Number: 5,171,405
[45] Date of Patent: Dec. 15, 1992

[54] REACTOR HAVING A DISCONTINUOUS CONDUIT MEANS BETWEEN SURFACES OF A DOWNWARDLY EXTENDING STATIONARY SPIRAL

[75] Inventor: Louis O. Torregrossa, Glens Falls, N.Y.

[73] Assignee: Kamyr, Inc., Glens Falls, N.Y.

[21] Appl. No.: 588,993

[22] Filed: Sep. 27, 1990

Related U.S. Application Data

[63] Continuation-in-part of Ser. No. 573,975, Aug. 28, 1990.

[51] Int. Cl.$^5$ .................. B01F 13/02; D21C 11/00
[52] U.S. Cl. ............................ 162/243; 422/185; 422/224
[58] Field of Search ............... 422/185, 224; 162/57, 162/243

[56] References Cited

U.S. PATENT DOCUMENTS

| | | | |
|---|---|---|---|
| 2,166,200 | 7/1939 | Thorne | 162/243 |
| 2,431,478 | 11/1947 | Hill | 162/243 |
| 3,833,461 | 9/1974 | Woodruff | 162/243 |
| 3,966,542 | 6/1976 | Oldshue | 162/243 |
| 4,016,029 | 4/1977 | Samuelson | 162/63 |
| 4,279,743 | 7/1981 | Miller | 209/211 |

FOREIGN PATENT DOCUMENTS 0157569  3/1985  European Pat. Off. .

*Primary Examiner*—Steve Alvo
*Attorney, Agent, or Firm*—Nixon & Vanderhye

[57] ABSTRACT

Organic constituents in a liquid, such as a waste water from a municipal or industrial process (e.g. bleach plant extraction liquor from the bleaching of paper pulp) may proceed effectively without the addition of alkali. When the organic constituents are reacted with an oxygen containing gas at appropriate pressure and temperature conditions, oxidized organics and gaseous acidic products of oxidation (e.g. $CO_2$) that are produced are continuously and immediately removed from the liquid so that they do not significantly contribute to lowering of the pH of the liquid, so that the reaction may proceed and the liquid remain alkaline. This may be accomplished in a gas sparged hydrocyclone in which the liquid is introduced into the first end of a vortex while oxygen is introduced from exteriorly of the vortex into contact with the liquid, or may be accomplished by causing the liquid to flow in a thin film in a downwardly extending spiral path and removing the acidic gases from a center portion of the spiral path. A reactor for effecting the last mentioned specific procedure includes a pressurized vertical vessel having a downwardly extending stationary spiral surface mounted in the vessel substantially concentric with it. Surface manifestations may be provided on the spiral surface for enhancing mixing of liquid with surrounding gas.

6 Claims, 4 Drawing Sheets

REACTOR HAVING A DISCONTINUOUS CONDUIT MEANS BETWEEN SURFACES OF A DOWNWARDLY EXTENDING STATIONARY SPIRAL

RELATED APPLICATIONS

This application is a continuation in part of application Ser. No. 07/573,975 filed Aug. 28, 1990 entitled "GAS SPARGED CENTRIFUGAL SEPARATION AND/OR MIXING".

BACKGROUND AND SUMMARY OF THE INVENTION

There are many industrial and municipal facilities that produce waste waters or like liquids having organic constituents. The organic constituents can be a significant source of pollution unless the waste waters are properly treated. Also the organic constituents may include a wide variety of products that would be useful if properly recovered.

It has been known for many years that under aqueous alkaline conditions, and relatively high pressures and temperatures, oxygen will break down organic molecules, i.e. oxidize them. There have been great difficulties in effectively utilizing this information, however, since the oxygen reaction that takes place produces organic acids, particularly from the production of carbon dioxide in the reaction. The organic acids neutralize the alkali and the reaction rate drops dramatically. Excessive amounts of alkali are thus needed to maintain satisfactory reaction rates, rendering such a procedure impractical.

According to the present invention, the problem of neutralization of the alkali is specifically dealt with by continuously and immediately removing the gaseous acidic products from the waste water so that they do not significantly contribute to lowering of the pH of the waste water, so that the reaction can proceed without the necessity of adding substantial additional alkali. This desirable result can be achieved according to the invention by utilizing known, or readily constructed, equipment.

One way to affect continuous and immediate removal of the gaseous acidic products is to utilize a gas sparged hydrocyclone, such as disclosed in the U.S. parent application Ser. No. 07/573,975, filed Aug. 28, 1990 (the disclosure of which is hereby incorporated by reference herein), or by utilizing the gas sparged hydrocyclone such as shown in co-pending U.S. application Ser. No. 07/573,978, filed Aug. 28, 1990 (the disclosure of which is hereby incorporated by reference herein). Alternatively, according to the invention the continuous and immediate removal of gaseous acidic products may be accomplished utilizing a reactor comprising a pressurized vertical vessel having a downwardly extending spiral surface therein over which the liquid to be treated flows in a thin film. Carbon dioxide, or like gaseous acidic products, are removed from a central portion of the spiral, while oxygen containing gas is introduced at the bottom of the vessel and/or at various intermediate points.

According to one aspect of the present invention, a method of oxidizing organic constituents in a liquid is provided, comprising the following steps: (a) If the liquid is not already alkaline, adding sufficient alkali to the liquid to render it alkaline. (b) Continuously reacting the organic constituents in the liquid with an oxygen containing gas at pressure and temperature conditions such that oxidized organics and gaseous acidic products of oxidation are produced. And, (c) continuously and immediately removing the gaseous acidic products from the liquid so that they do not significantly contribute to lowering of the pH of the liquid, so that the reaction in step (b) may proceed, the liquid remaining alkaline without the necessity of adding substantial additional alkali.

Steps (b) and (c) may be practiced by: (i) Introducing the liquid into the first end of a vortex. (ii) Introducing gas containing at least the oxygen content of ambient air from exteriorly of the vortex into contact with the liquid in the vortex. (iii) Removing treated liquid from the second end of the vortex, opposite the first end. And, (iv) removing gaseous acidic products from the first end of the vortex, at a non-liquid containing portion thereof.

Alternatively, steps (b) and (c) may be practiced by: (i) Causing the liquid to flow in a thin film in a downwardly extending spiral path, having a center portion in which essentially no liquid flows. (ii) Introducing gas containing at least the oxygen content of ambient air into intimate contact with the liquid as in flows in the spiral path. (iii) Removing treated liquid from the bottom of the path. And, (iv) removing gaseous acidic products from the center portion of the spiral path, at the top thereof.

Steps (b) and (c) may be further practiced, prior to step (i), by holding the liquid within a volume at a pressure greater than 10 psig and a temperature of greater than 100° C., introducing the gas having an oxygen at least as great as that of ambient air into the volume, and removing gaseous acidic products from the volume. Step (b) may be practiced utilizing air, and there may be the further steps, after step (c), of: (d) Continuously reacting the organic constituents in the liquid with a gas containing at least about 90% oxygen at pressure and temperature conditions such that oxidized organics and gaseous acidic products of oxidation are produced. And, (e) continuously and immediately removing the gaseous acidic products from the liquid so that they do not significantly contribute to lowering of the pH of the liquid, so that the reaction in step (d) may proceed, the liquid remaining alkaline without the necessity of adding additional alkali. After step (e), there may be the further step of treating the liquid with ozone (e.g. a mixture of ozone and carbon dioxide, or like beneficiating gas).

A wide variety of waste waters may be treated according to the present invention, such as bleach plant extraction stage liquor, which contains sodium ions. Byproducts may be recovered from the liquid, such as recovery of the sodium ions for use elsewhere in the pulp plant.

The liquid may be rendered alkaline by adding lime to it. Prior to reacting it with oxygen, the liquid may also be clarified, and a catalyst may be added to the liquid prior to, or contemporaneously with, the addition of oxygen thereto (e.g. iron may be added as a catalyst). While the pressure and temperature will vary greatly, and be dependent upon the particular liquid and organic constituents therein, the typical pressure range is about 10–200 psig, with a typical temperature range of about 100–200° C. While air may be utilized as the oxygen containing gas, air enriched with oxygen (e.g. 50% oxygen), or in some situations a gas containing at least about 90% oxygen, can be utilized.

The method of oxidizing organic constituents in a liquid utilizing a gas sparged hydrocyclone is also contemplated. That method comprises the following steps (a) If the liquid is not already sufficiently alkaline for the organic constituents therein to be readily oxidized, adding sufficient alkali thereto to render it sufficiently alkaline. (b) Introducing the liquid into the first end of a vortex. (c) Introducing gas containing at least the oxygen content of ambient air from exteriorly of the vortex into contact with the liquid in the vortex at pressure and temperature conditions such that oxidized organics and gaseous acidic products of oxidation are produced. (d) Removing treated liquid from the second end of the vortex, opposite the first end; and (e) removing gaseous acidic products from the first end of the vortex, at a non-liquid containing portion thereof.

The invention also relates to a novel reactor. The reactor according to the invention comprises the following components: A pressurized generally vertical vessel. A downwardly extending stationary spiral surface having a top, horizontal center, and bottom, and mounted in the vessel, substantially concentric therewith. Vertically aligned conduit means mounted at the horizontal center of vertically spaced portions of the spiral surface. A liquid inlet at the top of the vessel adjacent the top of the spiral surface. A liquid outlet from the bottom of the vessel, adjacent the bottom of the spiral surface. Gas removal means adjacent or above the liquid inlet at the top of the vessel. And, gas introducing means for introducing gas into the vessel below the liquid inlet. Surface manifestations may be provided on the spiral surface for enhancing mixing of liquid flowing over the surface with surrounding gas. The surface manifestations may be projections or roughened portions. The gas introduction may take place at the bottom of the vessel and/or at at least one point above immediately adjacent the spiral surface, with a velocity vector directing the gas toward the liquid.

It is the primary object of the present invention to provide for effective and efficient oxidation of organic constituents in a liquid, or other beneficiating action. This and other objects of the invention will become clear from an inspection of the detailed description of the invention, and from the appended claims.

DETAILED DESCRIPTION OF THE DRAWINGS

The oxidation of organic materials is accelerated by the presence of any alkali. Normally, the greater the $OH^-$ concentration, the greater the reaction rate. Oxidation can be further accelerated by a catalyst, such as iron. However oxidation under aqueous alkaline conditions, including relatively high temperatures and pressures (e.g. about 1000–2500 psig and 180–320° C.) has had practical limitations since the production of carbon dioxide and other organic acids neutralize the alkali and drop the reaction rate dramatically, to the point where the reaction is no longer feasible, or so much alkaline need be added that the process is not cost effective. According to the invention this is solved by immediately and continuously removing the gaseous acidic products from the aqueous alkaline liquid so that they do not significantly contribute to lowering of the pH of the liquid, and so that the reaction may proceed since the liquid remains sufficient alkaline without the necessity of adding substantial additional alkali (i.e. additional alkali in quantities that renders the process non-cost effective).

Figure 1:
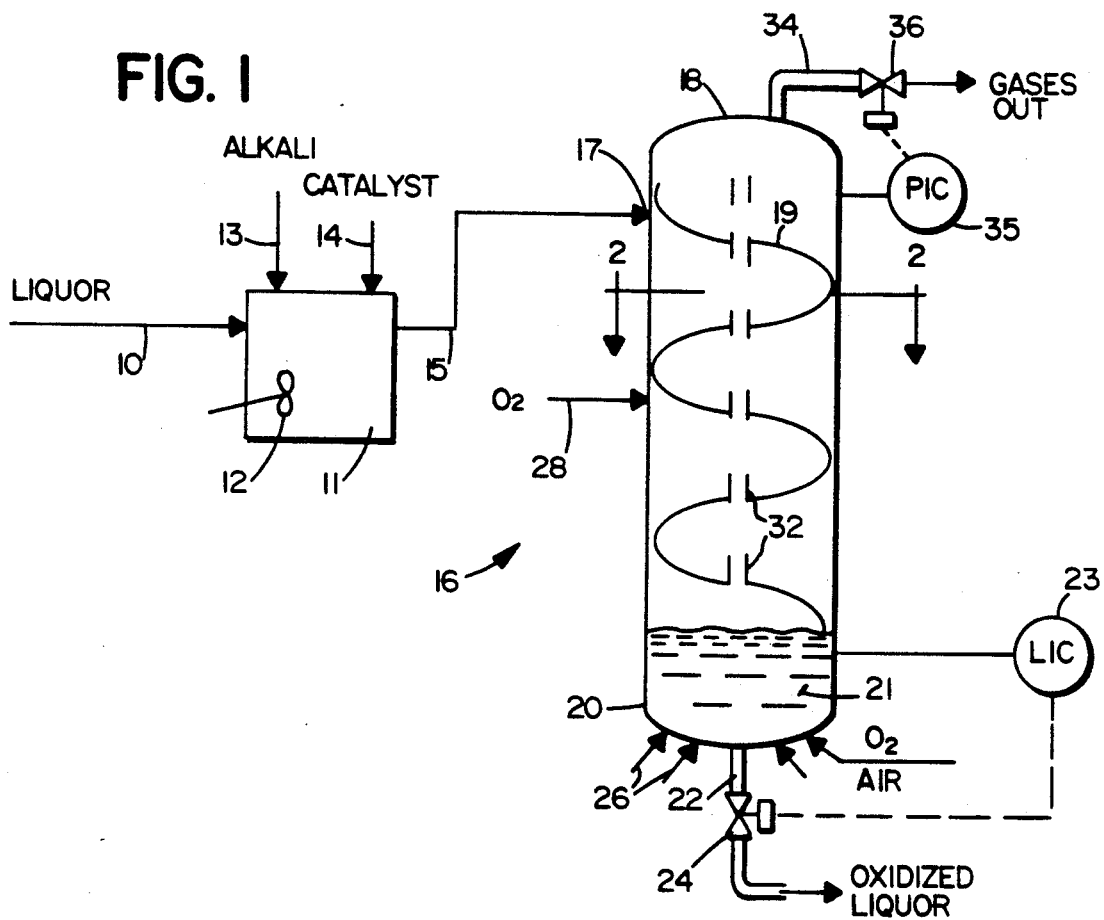
FIG. 1 is a side schematic view of a first embodiment of an exemplary reactor according to the present invention for practicing the method of the present invention.
Figure 2:
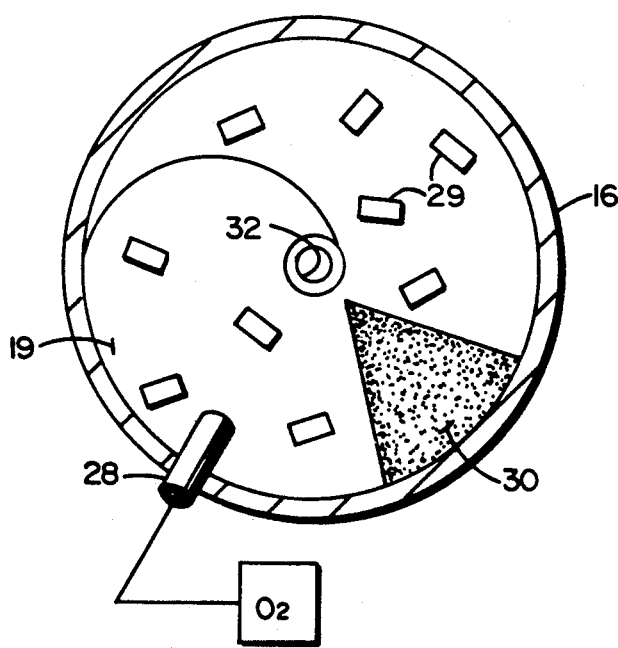
FIG. 2 is a cross-sectional view of the reactor of FIG. 1 taken along lines 2—2 thereof.

One exemplary form of apparatus for practicing the method according to the invention is illustrated schematically in FIGS. 1 and 2. Liquid containing organic constituents, such as the waste water from a municipal or industrial facility, is fed in line 10 to a mixing chamber 11 or the like, having a mixer 12 therein. If the liquid in conduit 10 is sufficiently alkaline, then no alkaline need be added in the chamber 11. However if it is not sufficiently alkaline for the organic constituents therein to be readily oxidized, sufficient alkali is added in line 13. The exact alkali added will depend upon cost, availability, and the particular liquid and organics involved, but under most circumstances it would be a source of calcium ions (e.g. lime), or a source of sodium ions. A catalyst to facilitate the oxygen reaction under alkaline conditions also may be added in line 14, such as an iron catalyst. The liquid mixed with alkaline and/or catalyst then flows in conduit 15 to be introduced into the generally vertical pressurized vessel 16 at a liquid inlet 17 adjacent the top 18 thereof.

The pressure and temperature conditions in the vessel 16 will be maintained for effective oxidation, e.g. about 10–200 psig and about 100–200° C. Stationarily mounted within the vessel 16 is a spiral or "screw" surface 19, which extends downwardly from a top portion thereof adjacent the liquid inlet 17, to adjacent the bottom 20 of the vessel 16. The surface 19 provides a surface over which a thin film of liquid to be treated flows from inlet 17, the liquid ultimately being collected at the bottom chamber 21 of the vessel 16. Treated liquid ultimately passes out of liquid outlet conduit 22. The level of liquid in the volume 21 may be controlled by the level controller 23 controlling the valve 24.

Oxygen containing gas, either air or oxygen (i.e. gas containing at least about 90% oxygen), may be sparged into the volume of liquid 21 in the bottom of the vessel 16 utilizing spargers 26, and/or may be introduced at various points along the flow path of the liquid down the spiral surface 19. For example, one or more oxygen introduction conduits 28 may be provided which introduce gas just above the spiral surface 19 so that it has a velocity vector directing the gas toward the thin film of liquid flowing down the spiral. Alternatively, the screw forming the spiral surface 19 can be hollow, and gas sparged into the liquid through holes formed in the surface 19. The spiral surface 19 may have surface manifestations thereon —such as projections 29 and/or roughened surface portions 30 (see FIG. 2) in order to promote mixing between the liquid and the surrounding or sparged oxygen containing gas.

In order to continuously and immediately remove the gaseous acidic products, e.g. carbon dioxide, from the liquid before they can be absorbed thereby, the vertically aligned central conduit means (sections) 32 are provided. The conduit means 32 are discontinuous between each of the vertically spaced portions of the spiral surface 19, and the conduit means have a conduit section 32 provided at each of the vertically spaced portions of the spiral surface 19. These conduit sections 32 are provided at substantially the center of the spiral 19, at vertically spaced portions along the length thereof (as seen in FIG. 1). Each conduit section 32 extends above the spiral surface 19 a distance greater than the thickness of the film of liquid so that the liquid will not flow into the conduit 32. However due to the fact that the conduit sections 32 are located at the center of the vessel 16 and the spiral path defined by the surface 19, gaseous reaction products will have a tendency to immediately flow thereto, and flow upwardly in the vessel 16 to be discharged from the top of the vessel 18 through conduit 34. The rate of discharge, and the pressure in the vessel 16, may be controlled by pressure controller 35 acting in association with valve 36 and gaseous products discharge conduit 34. Also, the introduction of oxygen containing gas, e.g. through spargers 26, creates an upward flow of gas that facilitates immediate entrainment of the gaseous reaction products, to move them away from the liquid so that it remains sufficiently alkaline to sustain the oxidation reaction.

Figure 3:
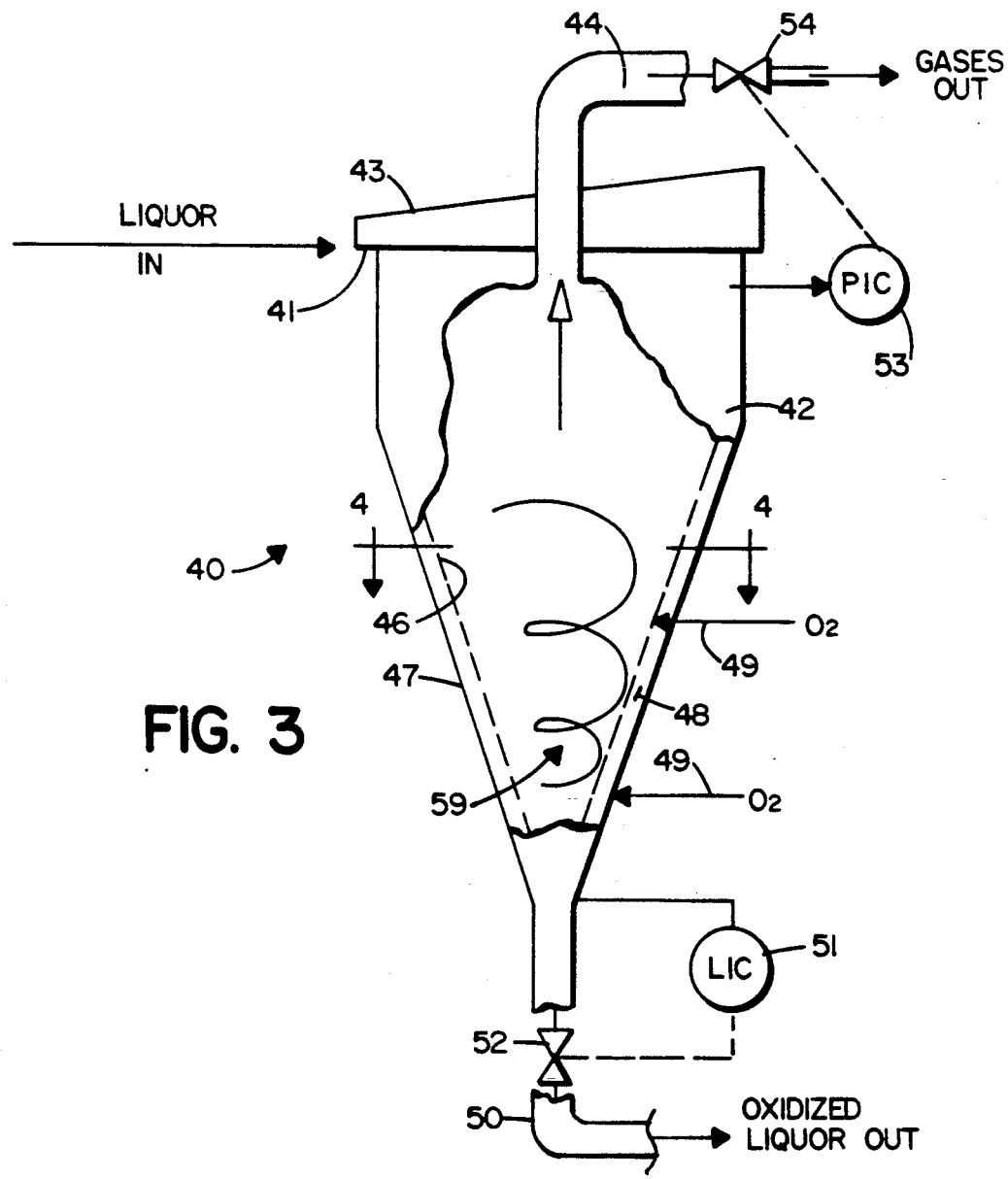
FIG. 3 is a side schematic view of another exemplary reactor for practicing the method of the present invention.

FIG. 3 illustrates another apparatus that may be used in practicing the method of oxidizing organic constituents in a liquid, according to the present invention. The structure illustrated generally by reference numeral 40 in FIG. 3 is a gas sparged hydrocyclone. It may have the configuration illustrated, or any of the configurations illustrated and described in said co-pending applications Ser. Nos. 07/573,975 and 07/573,978, both filed Aug. 28, 1990, and/or in U.S. Pat. Nos. 4,399,027, 4,279,743, and 4,838,434, the disclosures of which are hereby incorporated by reference herein.

The most significant components of the gas sparged hydrocyclone 40 comprise the liquid inlet 41, a main body or vortex chamber 42 having a top 43, a gas outlet 44 from the center of the top 43, a gas porous wall 46 of the body 42 surrounded by another, solid wall 47 to define a gas filled chamber 48 therebetween, with an inlet or inlets 49 for gas into the chamber 48, and a oxidized constituents, liquid outlet 50 from the bottom of the body 42. A liquid level may be maintained in the very bottom of the body 42, as controlled by controller 51, controlling a valve 52 in the outlet 50. Similarly, the device 40 is pressurized by a conventional pressure controller 53 adjacent the top 43 of the device 40, controlling the valve 54 in gas outlet 44. The device 40 is maintained at relatively high pressure and temperature conditions, such as described earlier with respect to the FIGS. 1 and 2 embodiment.

Figure 4:
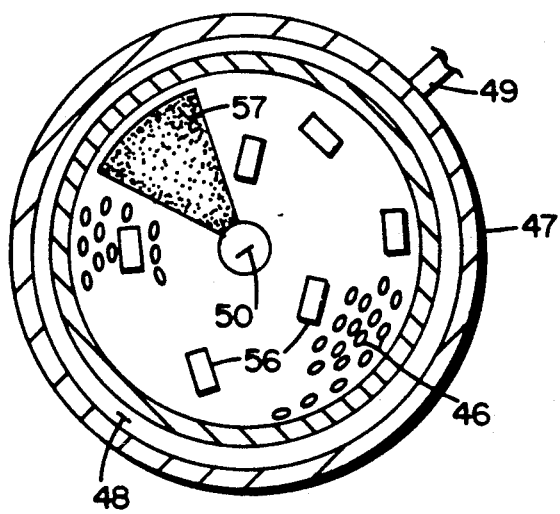
FIG. 4 is a cross sectional view taken along lines 4—4 of FIG. 3.

In order to facilitate mixing between the liquid introduced into the device 40, and the oxygen containing gas introduced in gas inlets 49, the surface (e.g. cone) of the porous wall 46 may have surface manifestations formed thereon to facilitate mixing between the swirling liquid and the surrounding oxygen gas. For example a plurality of projections 56 may be provided, and/or one or more roughened surface portions 57 (see FIG. 4).

The liquid containing organic constituents is introduced into the tangential liquid inlet 41, and the liquid forms a vortex—illustrated generally by reference numeral 59 in FIG. 3—within the volume defined by the body 42. The vortex may have a generally vertical axis—as illustrated in FIG. 3—or it may have a wide variety of other orientations, with the gas outlet 44 adjacent the liquid inlet 41 (but at a portion of the body 43 where no liquid is present), and with the liquid outlet 50 at the second end of the device 40, opposite the first end having the liquid inlet 41. The gas introduced may be ambient air, air enriched with oxygen (e.g. about 50% oxygen), oxygen (i.e. a gas having at least about 90% oxygen), or—in aspects to be hereafter described—ozone, or another beneficiating gas (e.g. hydrogen or methane).

Figure 5:
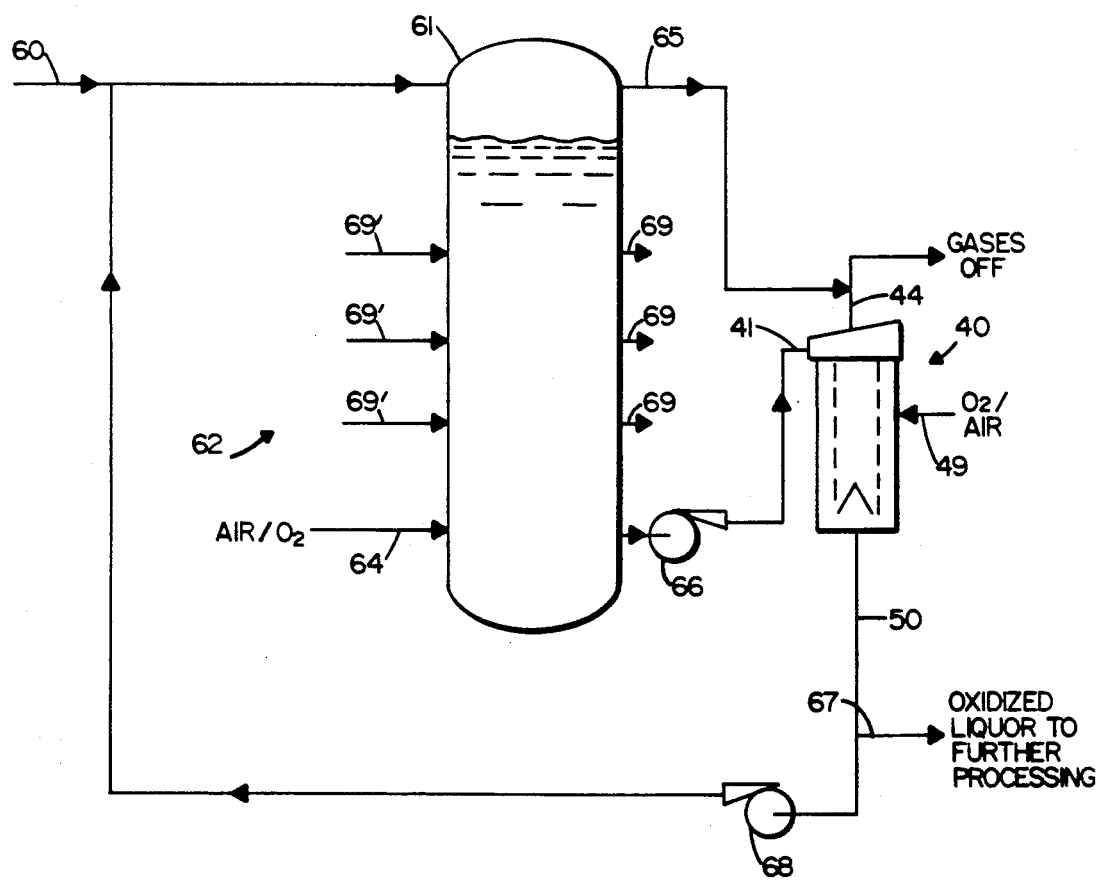
FIG. 5 is a side schematic view of the utilization of the apparatus of FIG. 3 in conjunction with another reactor.

FIG. 5 illustrates a system utilizing one of the devices 40 therein, but having pretreatment of the liquid prior to introduction into the hydrocyclone 40. In the system of FIG. 5, waste water in line 60 is introduced into the top 61 of a pressurized reaction vessel 62 having "mild" conditions therein. The vessel 62 preferably is upright, and is maintained at a pressure of greater than 10 psig, and a temperature of greater than 100° C.; e.g. about 150 psig and about 140° C. The liquid is held within the reaction vessel 62 while air or oxygen are introduced into the liquid, e.g. through sparger 64 at the bottom of the vessel 62. Gases—e.g. carbon dioxide—are vented from the top vent 65 (which may ultimately connect to the gas outlet 44 from device 40), while liquid adjacent the bottom of the reactor 62 is pumped by pump 66 to the inlet 41 to hydrocyclone 40. The oxidized constituent liquor is withdrawn through conduit 67 from liquid outlet 50 for further processing (e.g. removal of valuable byproducts), while a portion of the liquid from conduit 50 is recirculated by pump 68 back to line 60.

Instead of just withdrawing liquid from reactor 62 at the level of pump 66, it is desirable to withdraw liquid at a number of different heights in reactor 62—e.g. see lines 69. Each line 69 may be connected to a hydrocyclone 40, or the like, and a portion of the oxidized liquid withdrawn from the hydrocyclones may be recirculated back to reactor 62 and introduced at different levels, e.g. see return lines 69'.

While the systems described above have been described primarily with respect to only a single or dual reaction vessels, any number of reaction vessels can be provided in series and in parallel in order to accomplish the desired end results.

Figure 6:
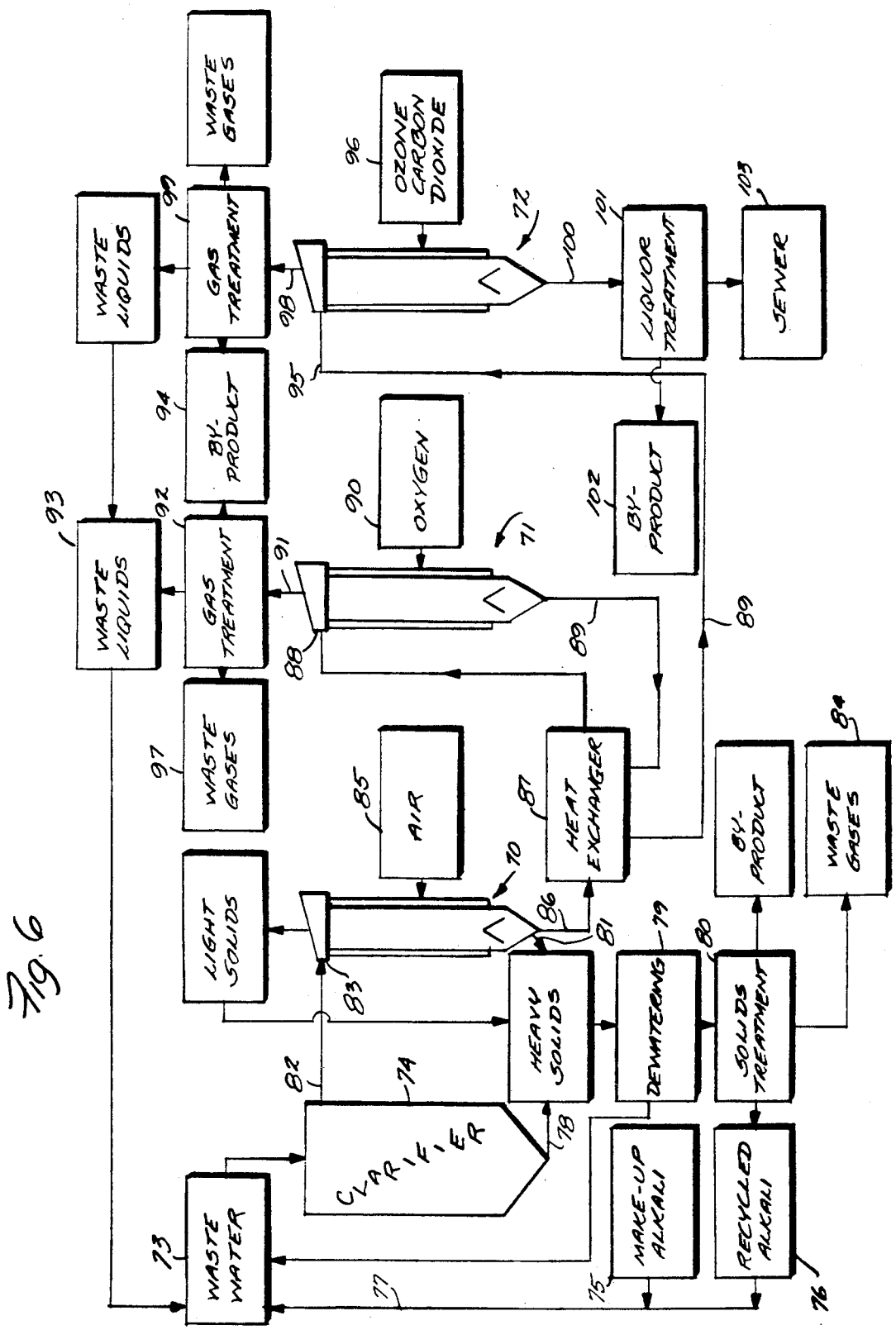
FIG. 6 is a schematic view showing exemplary apparatus for treating bleach plant effluent, or a like waste water, according to the method of the invention.

FIG. 6 schematically illustrates in greater detail one exemplary system for acting upon organic constituent containing liquid according to the invention, such as bleach plant extraction stage liquor. In this embodiment gas sparged hydrocyclones 70, 71, 72 are illustrated as the main reaction vessels, although other reaction vessels which continuously and immediately remove the gaseous acidic products from the liquid—such as illustrated in FIGS. 1 and 2—could be provided.

In the system of FIG. 6, the bleach plant effluent or like waste water to be treated is fed from source 73 to a clarifier 74 so that the heavier solids therein will settle out. Alkali—both fresh alkali from source 75 and recycled alkali from source 76—may be added to the waste water, as indicated by line 77. The heavy solids discharged from the bottom of the clarifier 74 are discharged in line 78, dewatered by dewatering equipment 79, and treated to remove alkali and generate valuable byproducts at stage 80. Preferably the hydrocyclone 70 is of the type illustrated in said co-pending application Ser. No. 07/573,978 filed Aug. 28, 1990 which has a discharge conduit 81 for solids, those solids being combined with the solids in the conduit 78 for treatment at stage 80.

The clarified liquid from clarifier 74 is fed via line 82 to the liquid inlet 83 to the hydrocyclone 70, a vortex being formed in the hydrocyclone 70. Any light solids extracted in the pressurized hydrocyclone 70 that are discharged with the waste gases are combined with the heavy solids from lines 78, 81, with the ultimate gaseous acidic products—e.g. waste gases—being discharged as indicated at 84 from solids treatment stage 80. In the first hydrocyclone 70, air from source 85 is introduced as the oxygen containing gas.

The liquid discharged in line 86 from the first hydrocyclone 70 preferably passes through a heat exchanger 87, and then to the inlet 88 to the second hydrocyclone 71. In the heat exchanger 87 it is in heat exchange relationship with the liquid in discharge line 89 from the bottom of hydrocyclone 71. In the second hydrocyclone 71, oxygen gas (i.e. gas having at least about 90% oxygen, e.g. 99+% oxygen) from source 90 is introduced as the oxidizing gas, with the acidic gaseous components discharged in line 91 from the top of the hydrocyclone 71. The gases from line 91 are treated in a suitable gas treatment stage 92, to produce waste liquids at stage 93 (which are ultimately recirculated to the source 73), waste gases, which are discharged, and byproducts—e.g. see stage 94.

The liquid in line 89 is ultimately fed to the inlet 95 to the third hydrocyclone 72. In the third hydrocyclone 72, ozone is introduced from source 96, the ozone further degrading the organic molecules in the liquid. At the third hydrocyclone 72, alkaline conditions may no longer be favorable. Instead acidic conditions may be favorable. If that is the case, then the carbon dioxide—possibly that earlier generated, as in waste gas boxes 97 and 84—may be introduced with the ozone in order to provide the proper conditions. The gases discharged in the top conduit 98 enter a gas treatment stage 99 comparable to the stage 92, while the treated liquor is discharged in conduit 100 and passes to liquor treatment stage 101. At the liquor treatment stage 101 any valuable byproducts are removed as indicated at 102, while the rest of the liquor is sewered as indicated at 103. The liquid that is sewered has most of the organic constituents thereof removed, and poses a greatly reduced pollution problem.

When the system as described with respect to FIG. 6 is used to treat bleach plant effluent, as one example of the waste water that it can treat, has a number of practical advantages. The effluent sewered at 103 is essentially pure so that no extensive additional treatment is necessary. The bleach plant chemical costs could be reduced because chlorine could be utilized instead of chlorine dioxide, which is more expensive than chlorine. Also some caustic can be recovered from the extraction stage for recirculation, and the cost of chlorine balance is more favorable. Oxygen delignification—sometimes practiced—can be eliminated. The recovery boiler, liquor making, in evaporator plants then do not have the extra loading typically caused by the oxygen delignification stage, and there is no necessary to increase the size of the chlorine dioxide generator. Also the byproducts recovered at the various boxes indicated in FIG. 6 may be saleable commodities.

In all of the processes described above, the choice of alkali, pressure, temperature, and other conditions are selected so as to be able to shift the equilibrium reaction shown below to the right (where the alkali is indicated by "A"):

$$ACO_3 + H_2O \rightleftharpoons 2AOH + CO_2.$$

It will thus be seen that according to the present invention a method of beneficiating waste water is provided, preferably a method of oxidizing organic constituents that does not require addition of substantial (non-cost effective) amounts of additional alkali, has been provided, as well as a particular reactor for facilitating the continuous and immediate removal of gaseous acidic products from liquid in which the organic constituents are being oxidized. Thus practical oxidation under aqueous alkaline high temperature, high pressure conditions (with or without a catalyst, such as iron) can be provided.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and devices.

What is claimed is:

1. A reactor comprising:
   a pressurized generally vertical vessel;
   a downwardly extending stationary spiral surface having a top, horizontal center, and bottom, and mounted in said vessel, substantially concentric therewith;
   vertically aligned conduit means mounted at the horizontal center of vertically spaced portions of said spiral surface;
   a liquid inlet at the top of the vessel adjacent the top of the spiral surface, said conduit means being discontinuous between each of said vertically spaced portions of said spiral surface, and said conduit means having a conduit section provided at each of said vertically spaced portions of said spiral surface, wherein each conduit section extends above each respective portion of the spiral surface a distance effective for preventing a film of liquid or the spiral surface from flowing into said conduit;
   a liquid outlet from the bottom of the vessel, adjacent the bottom of the spiral surface;
   gas removal means adjacent or above the liquid inlet at the top of the vessel; and
   gas introducing means for introducing gas into the vessel below the liquid inlet.

2. A reactor as recited in claim 1 further comprising surface manifestations on said spiral surface for enhancing mixing of liquid flowing over said surface with surrounding gas.

3. A reactor as recited in claim 2 wherein said surface manifestations are projections upstanding from said surface.

4. A reactor as recited in claim 2 wherein said surface manifestations are roughened portions of said surface.

5. A reactor as recited in claim 1 wherein said gas introducing means introduce gas into said vessel adjacent the bottom of said spiral surface.

6. A reactor as recited in claim 5 wherein said gas introducing means also introduces gas at at least one point above but immediately adjacent said spiral surface with a velocity vector directing the gas toward the liquid.

* * * * *